US008098184B2

(12) United States Patent
Chen et al.

(10) Patent No.: US 8,098,184 B2
(45) Date of Patent: *Jan. 17, 2012

(54) MOTORCYCLE COMMUNICATION SYSTEM WITH RADAR DETECTOR, AND MOUNTING ASSEMBLIES THEREFOR (75) Inventors: Wayne Chen, New York, NY (US); Adam Gold, New York, NY (US); Andrew Serbinski, Annandale, NJ (US); John Gardner, Mullica, NJ (US)

(73) Assignee: Adaptiv Technologies LLC NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/925,498

(22) Filed: Oct. 22, 2010

(65) Prior Publication Data
US 2011/0037638 A1 Feb. 17, 2011

Related U.S. Application Data (63) Continuation of application No. 12/380,812, filed on Mar. 4, 2009, now Pat. No. 7,830,298, which is a continuation of application No. 11/707,476, filed on Feb. 16, 2007, now Pat. No. 7,504,983.

(51) Int. Cl.
G01S 7/42 (2006.01)
B62K 21/12 (2006.01)
(52) U.S. Cl. ........................................................ 342/20
(58) Field of Classification Search .................. 342/20
See application file for complete search history.

(56) References Cited

U.S. PATENT DOCUMENTS

| 4,719,462 A | 1/1988 | Hawkins |
| 4,725,840 A | 2/1988 | Orazietti |
| 4,760,497 A | 7/1988 | Roston |
| 4,818,997 A | 4/1989 | Holmes |
| 4,836,482 A | 6/1989 | Sokol |
| 4,896,855 A | 1/1990 | Furnish |
| 5,005,661 A | 4/1991 | Taylor |
| 5,016,850 A | 5/1991 | Plahn |
| 5,020,754 A | 6/1991 | Davis |
| 5,034,747 A | 7/1991 | Donahue |
| 5,114,060 A | 5/1992 | Boyer |
| RE34,120 E | 11/1992 | Plahn |
| 5,291,203 A | 3/1994 | Schneck |
| 5,525,989 A | 6/1996 | Holt |
| 5,573,164 A | 11/1996 | Law |
| 5,667,176 A | 9/1997 | Zamarripa |
| 5,668,554 A | 9/1997 | Orr |
| 5,684,488 A | 11/1997 | Liautaud |
| 5,735,441 A | 4/1998 | Fujimoto |
| 5,781,145 A | 7/1998 | Williams |
| 5,911,395 A | 6/1999 | Hussaini |
| 6,201,498 B1 | 3/2001 | Fan |

(Continued)

*Primary Examiner* — Daniel Pihulic
(74) *Attorney, Agent, or Firm* — Raymond Sun (57) ABSTRACT A communication system for use with a motorcycle includes a main unit that has a detector and a transmitter that transmits an alert signal upon the detection of a radar or laser by the detector. The system further includes either a visual indicator or an audio indicator. The visual indicator has a receiver that receives the alert signal from the transmitter, and a display which provides a visual display of the alert signal. The audio indicator has a receiver that receives the alert signal from the transmitter, and a speaker which emits an auditory response of the alert signal. The system can further include a mounting assembly having a connector that is removably connected to a part of a motorcycle, a support bracket to which the main unit is removably coupled, and a link that pivotably couples the support bracket and the connector.

2 Claims, 10 Drawing Sheets

U.S. PATENT DOCUMENTS

| | | |
|---|---|---|
| 6,305,656 B1 | 10/2001 | Wemyss |
| 6,315,182 B1 | 11/2001 | Chen |
| 6,378,815 B1 | 4/2002 | Lee |
| 6,384,776 B1 | 5/2002 | Martin |
| 6,390,429 B1 | 5/2002 | Brincat |
| 6,561,400 B2 | 5/2003 | Lee |
| 6,779,765 B2 | 8/2004 | Zheng |
| 6,783,040 B2 | 8/2004 | Batchelor |
| 6,861,970 B1 | 3/2005 | Garland |
| 6,943,723 B2 | 9/2005 | Kim |
| 6,950,053 B1 | 9/2005 | Peterson |
| 6,957,755 B2 | 10/2005 | Mahoney |
| 6,975,215 B2 | 12/2005 | Schofield |
| 7,010,727 B1 | 3/2006 | Stucker |
| 7,504,983 B2 * | 3/2009 | Chen et al. ............ 342/20 |
| 7,830,298 B2 * | 11/2010 | Chen et al. ............ 342/20 |
| 2003/0026440 A1 | 2/2003 | Lazzeroni |
| 2003/0052797 A1 * | 3/2003 | Rock et al. ............ 340/936 |
| 2003/0106974 A1 | 6/2003 | Guertin |
| 2004/0099775 A1 | 5/2004 | Zheng |
| 2004/0108348 A1 | 6/2004 | Barnes |
| 2004/0262350 A1 | 12/2004 | Batchelor |
| 2005/0092887 A1 | 5/2005 | Adams |
| 2005/0121483 A1 | 6/2005 | Barnes |
| 2005/0200514 A1 | 9/2005 | Peterson |
| 2006/0012468 A1 | 1/2006 | Finley et al. |
| 2006/0012509 A1 | 1/2006 | Bartosik |
| 2006/0029235 A1 | 2/2006 | Lazzeroni |
| 2006/0066468 A1 | 3/2006 | Iszley |
| 2006/0139203 A1 | 6/2006 | Kim |
| 2008/0198061 A1 | 8/2008 | Chen et al. |

* cited by examiner

MOTORCYCLE COMMUNICATION SYSTEM WITH RADAR DETECTOR, AND MOUNTING ASSEMBLIES THEREFOR

RELATED CASES

This is a continuation application of Ser. No. 12/380,812, filed Mar. 4, 2009, now U.S. Pat. No. 7,830,298, which is a continuation of Ser. No. 11/707,476, filed Feb. 16, 2007, now U.S. Pat. No. 7,504,983, whose disclosures are incorporated by this reference as though fully set forth herein.

BACKGROUND OF THE INVENTION

1. Field of the Invention

The present invention relates to a communication system that can be used with a motorcycle, and mounting assemblies that can be used to mount the main unit of the system to the motorcycle. The communication system includes a radar and/or detector.

2. Description of the Prior Art

Most radar detectors are designed for use inside or with automobiles. Unfortunately, it is more challenging to adapt radar detectors for use with motorcycles.

First, noise is a major problem, because the road noise cannot be insulated or blocked out. Wind and engine noises also pose similar problems. As a result, the motorcycle rider cannot hear audible alerts issued by the radar detector.

Second, the rider often cannot see visual alerts being emitted by the radar detector because the radar detector is often mounted at a location that is outside the rider's visual field. In addition, motorcycles also receive more direct sunlight than automobiles, and the direct sunlight can make it difficult for the rider to see the displays on the radar detector.

Third, riders often wear gloves when riding. The buttons on conventional radar detectors are small, so they are difficult to actuate when wearing gloves.

Fourth, mounting a radar detector to a motorcycle can be challenging because one must find a location on a motorcycle that provides a good fit, is visually appealing, and does not interfere with the rider's operation of the motorcycle.

Fifth, waterproofing can also be a problem. Conventional automobile radar detectors are not waterproof, and are therefore not well suited for use with motorcycles.

Many of these issues also apply to the provision of any communication unit on a motorcycle. For example, audio devices (e.g., radios, music players), phones, and similar appliances will experience similar problems as a radar detector when used with a motorcycle.

SUMMARY OF THE DISCLOSURE

It is an object of the present invention to provide a communication system that can conveniently and effectively be used with a motorcycle.

It is another object of the present invention to provide a radar detector that can conveniently and effectively be used with a motorcycle.

It is yet another object of the present invention to provide a mounting system that effectively and conveniently mounts a communication unit to a motorcycle.

In order to accomplish the objects of the present invention, the present invention provides a communication system for use with a motorcycle, which includes a main unit that has a detector and a transmitter that transmits an alert signal upon the detection of a radar or laser by the detector. The system further includes either a visual indicator or an audio indicator. The visual indicator has a receiver that receives the alert signal from the transmitter, and a display which provides a visual display of the alert signal. The audio indicator has a receiver that receives the alert signal from the transmitter, and a speaker which emits an auditory response of the alert signal. The system can further include a mounting assembly having a connector that is removably connected to a part of a motorcycle, a support bracket to which the main unit is removably coupled, and a link that pivotably couples the support bracket and the connector.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

FIGS. 1-4 illustrate one embodiment of a communication system 20 according to the present invention. The communication system 20 includes a main unit 22, a visual indicator 24, and an audio indicator 26. The main unit 22 can be packaged for use with either the visual indicator 24 or the audio indicator 26, since the visual indicator 24 is not necessary if the audio indicator 26 is being used, and vice versa.

Figure 1:
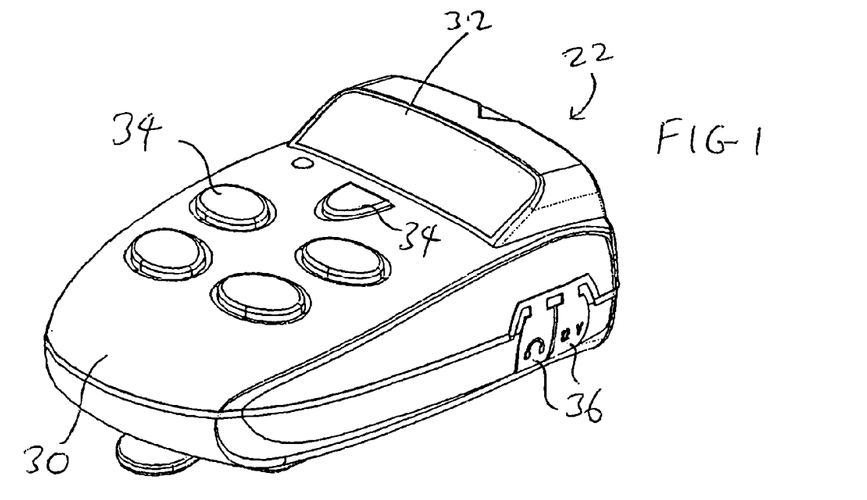
FIG. 1 is a perspective view of the main unit of a communication system according to one embodiment of the present invention.
Figure 4:
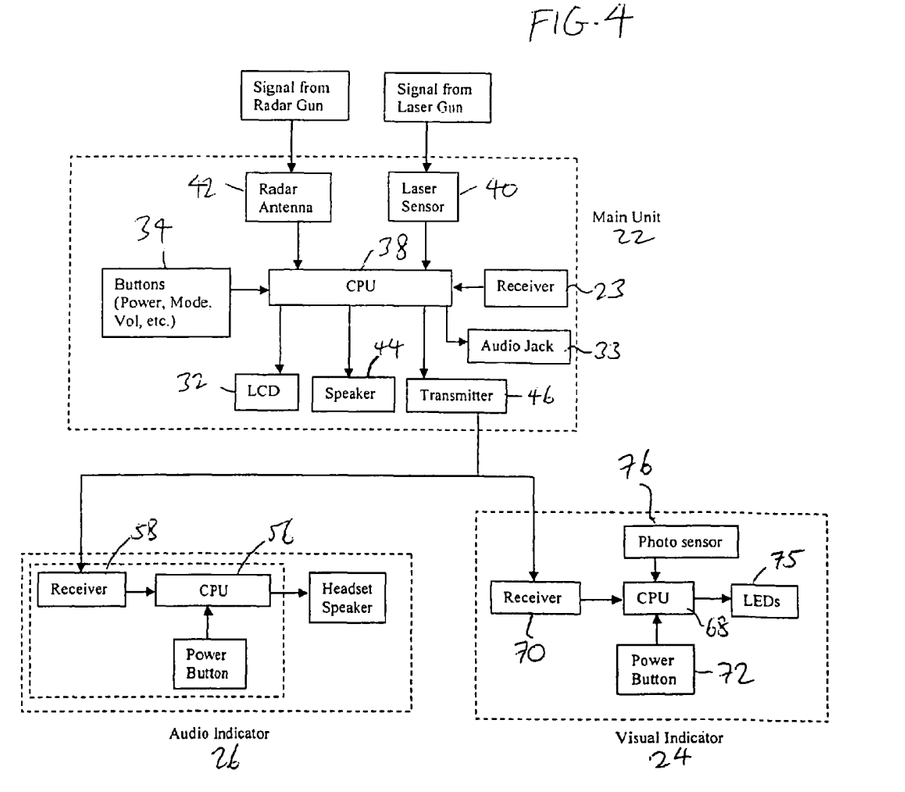
FIG. 4 is a schematic block diagram illustrating the communication system according to one embodiment of the present invention.

The main unit 22 operates in the same manner as a conventional automobile radar detector. Referring to FIGS. 1 and 4, the main unit 22 has a housing 30 (which can be made of two housing pieces), with an LCD display 32 provided at an angled orientation on the top surface of the housing 30 to allow for convenient viewing by a rider, or even in an automobile. The LCD display 32 is adapted to display important information such as modes, signals detected, volume, etc. The LCD display 32 is positioned at the distal end of the housing 30 at an angle of approximately 30 degrees to the horizontal. It was determined that this angle provides the optimum position for viewing on a sportbike or cruiser, while still allowing for viewing on a dashboard of an automobile. A plurality of buttons 34 are provided in spaced-apart manner on the top surface of the housing 30. The buttons 34 can be made very large (e.g., with a diameter of about half an inch) so that they can be easily pressed by a rider wearing gloves.

The main unit 22 has two jacks on the side of the housing 30, with the jacks covered by jack covers 36. One jack is for receiving a power line, and the other jack is an audio output jack 33 that is adapted to receive an audio output line. A variety of different devices can be coupled to the audio output jack. For example, some riders use a communication system to communicate with other riders, which includes speakers within a rider's helmet. These communication systems can operate like a two-way radio, and uses an existing headset that would allow the main unit 22 to be integrated with an already-existing communication system. One example is the GMRS X1 made by Chatterbox. Another device that can be plugged into the audio output jack is a BLUETOOTH™ adapter, which is a small electronic device that usually plugs into non-BLUETOOTH™ phones so that they can be used with BLUETOOTH™ headsets. Plugging a BLUETOOTH™ adapter into the radar detector main unit 22 would allow the rider to use a BLUETOOTH™ headset to receive alert signals.

The housing 30 is designed to be water-resistant by providing a rubber gasket between the two housing pieces. The buttons 34 are also made of rubber and inserted into wells using an interference fit. A rubber gasket can be sandwiched between the jacks and the inside of the housing 30. Other plastic components can be ultrasonically welded or heat staked to maximize the waterproofing.

The main unit 22 also houses the electronics for the radar detector, including a controller (CPU) 38, a laser sensor 40 and a radar antenna 42. The laser sensor 40 is adapted to receive conventional laser signals from a laser gun, and the radar antenna is adapted to receive conventional microwave radar signals from a radar gun. The laser sensor 40 and the radar antenna 42 are coupled to the controller 38 to provide these signals to the controller 38, and can be embodied in the form of any of the conventional laser sensors and radar antennas that are available in the marketplace. A transmitter 46 (e.g., an antenna) is coupled to the controller 38 to transmit the necessary signal to either a visual indicator 24 or an audio indicator 26. A speaker 44 is coupled to the controller 38 for broadcasting an audible beep or other audio indication to warn the rider that a police radar is nearby. The actual speaker 44 is not shown in FIG. 1, but is located at a hole at the bottom of the housing 30. A film can be placed over the speaker at the location of the speaker hole to provide the needed waterproofing. However, since the audible beep may be drowned out by the road noise encountered by a rider on a motorcycle, a separate indicator 24 or 26 is provided to alert the rider.

Although not shown in FIG. 4, those skilled in the art will appreciate that the main unit 22 can be powered by batteries (not shown), or wired to the motorcycle's power source.

Conventional radar antennas are normally embodied in the form of a horn-type antenna that detects microwaves and photodiodes to detect laser beams. Unfortunately, the horn occupies a large amount of space. Therefore, as an alternative, the radar antenna 42 can be embodied in the form of a microstrip antenna. Since microstrip antennas should be mounted vertically when in use, the antenna can be housed in a pivotable or movable housing which is flipped up (similar to a mobile phone) when the main unit 22 is in use. The LCD display 32 can even be provided in the pivotable part of the housing so that the display 32 can be flipped open like the display on a mobile phone.

Figure 2:
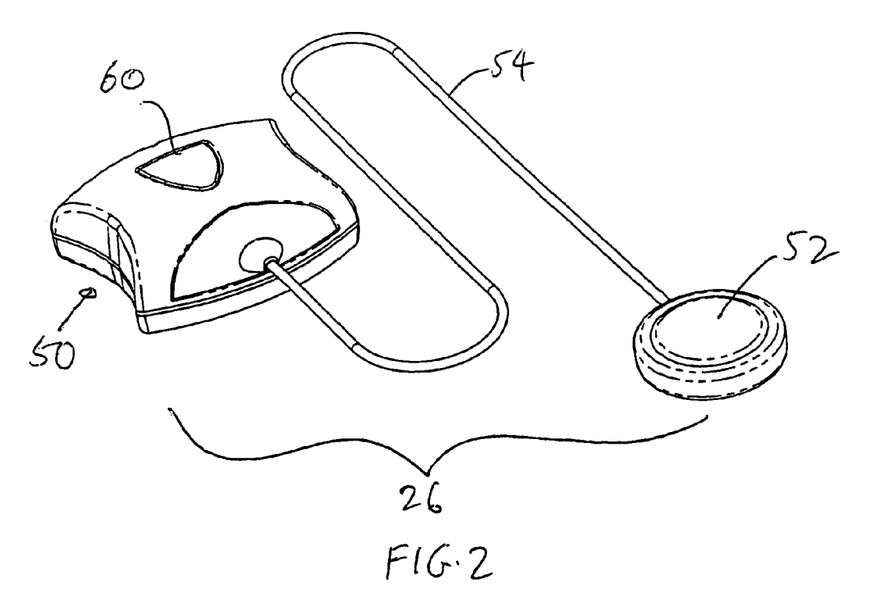
FIG. 2 is a perspective view of the audio indicator of a communication system according to one embodiment of the present invention.

Referring to FIGS. 2 and 4, the audio indicator 26 includes a receiver module 50 and a speaker 52 that are coupled together by a wire 54. The receiver module 50 can be mounted to the outside of the rider's helmet using VELCRO™, double-sided tape, hooks, or other similar attachment mechanisms. The speaker 52 can be mounted inside the helmet (using similar attachment mechanisms) adjacent the rider's ear. The wire 54 couples the receiver module 50 and the speaker 52, such as by feeding the wire 54 between the soft inner foam and hard outer shell of the helmet. The receiver module 50 houses a controller (CPU) 56 that is coupled to a receiver 58 (e.g., an antenna) and a power button 60 that is used to turn the receiver module 50 on and off. When the main unit 22 detects a radar or laser signal, it transmits (via the transmitter 46) the information to the controller 56 via the receiver 58, which in turn causes the speaker 52 to emit a warning signal to the rider. The pitch and frequency of the warning signal can vary depending on the signal strength and type (e.g., K band, Ka band, X band, laser). The housing of the receiving module 50 can be made water-resistant in the same manner as the housing 30 described above.

Figure 3:
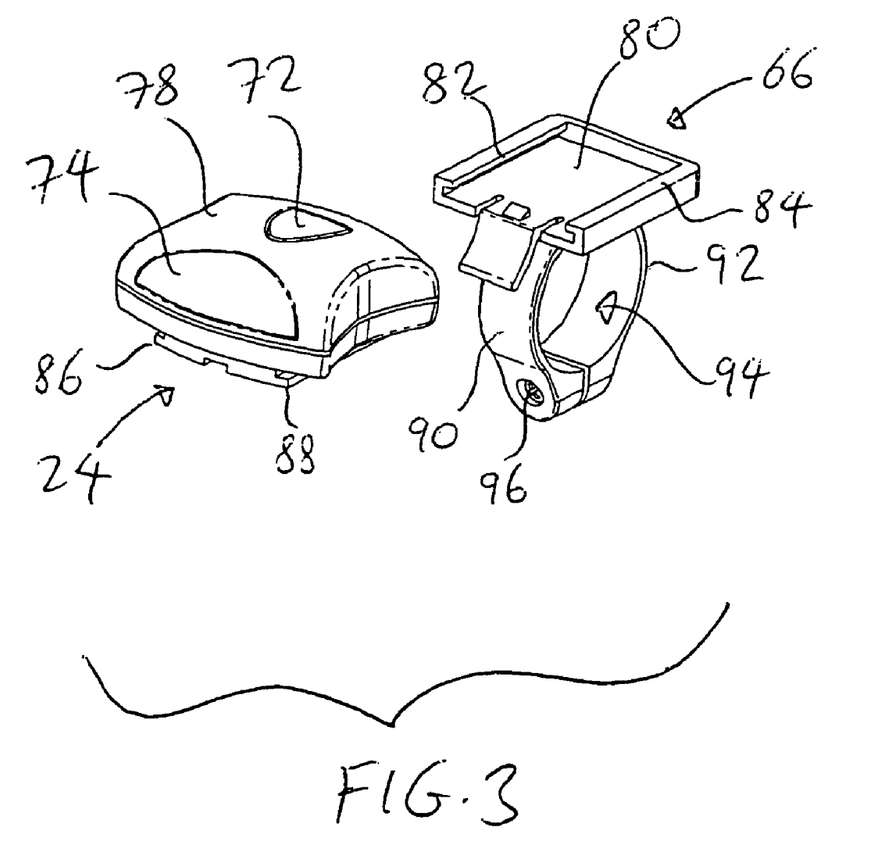
FIG. 3 is an exploded perspective view of the visual indicator of a communication system according to one embodiment of the present invention.

Referring to FIGS. 3 and 4, the visual indicator 24 can be mounted to the top of the gauges or the windsscreen using VELCRO™, double-sided tape, hooks, or other similar attachment mechanisms. Alternatively, it can be mounted to the handlebar of a motorcycle via a mount 66. The housing 78 of the visual indicator 24 can be water-resistant in the same manner as the housing 30 described above. A window 74 can be provided on the housing 78 for shielding a plurality of light-emitting diodes (LEDs) 75. The visual indicator 24 houses a controller (CPU) 68 that is coupled to a receiver 70 (e.g., an antenna) and a power button 72 that is used to turn the visual indicator 24 on and off. When the main unit 22 detects a radar or laser signal, it transmits (via the transmitter 46) the information to the controller 68 via the receiver 70, which in turn causes the LEDs 75 to light up or flash, thereby alerting the rider. The LED flash frequency can correlate to the strength of the detected signal and the type of signal. The LEDs 75 can also flash in different colors to indicate different radar bands, lasers, and the like.

In addition, extremely bright LEDs 75 are necessary in order for the flashing to be visible to the rider in daylight. However, high intensity flashing of the LEDs 75 at night can be distracting and dangerous, so a photosensor 76 is incorporated with the visual indicator 24, and cooperates with the controller 68, to adjust the intensity of the LEDs 75 to appropriate levels depending on whether it is daytime or nighttime. The user can also manually control the intensity level using the buttons 34 on the main unit 22.

The mount 66 can have a mounting plate 80 that has opposite L-shaped tracks 82, 84 that define a rail track for receiving a corresponding set of opposing L-shaped flanges 86, 88 extending from the bottom of the housing 78. The mounting plate 80 can be mounted on to the top of a pair of semi-circular holders 90, 92, with the holders 90, 92 defining a generally round interior space 94 that is adapted to receive the shaft of a handlebar of a motorcycle. In one embodiment, the mounting plate 80 and the holders 90, 92 can be provided in the same piece. In use, the holders 90, 92 are placed around the shaft of a handlebar, and a screw 96 is threaded through threaded bores in the bottom of the holders 90, 92 to secure the holders 90, 92 together around the shaft. The flanges 86 and 88 can then be slid under the tracks 82 and 84, respectively, to secure the visual indicator 24 to the mount 66.

In addition to the visual indicator 24 and the audio indicator 26, other indicators can be used to alert the rider. For example, for riders who do not wear helmets, an audio indicator in the form of an earpiece can be clipped to a rider's collar or jacket, or secured around the rider's ear. As another example, a vibrating band 98 (see FIG. 5) can be worn by the rider around the wrist, neck or other body part, and adapted to vibrate when the main unit 22 detects a police radar nearby. The vibrating band can have the same components as the audio indicator 26 except that the speaker 52 is replaced by a vibrating mechanism. As yet another alternative, a receiver (similar to 58) can be mounted to the frame of a rider's sunglasses, and a visual, audio, vibrating or other alert can be provided on the sunglasses.

Figure 5:
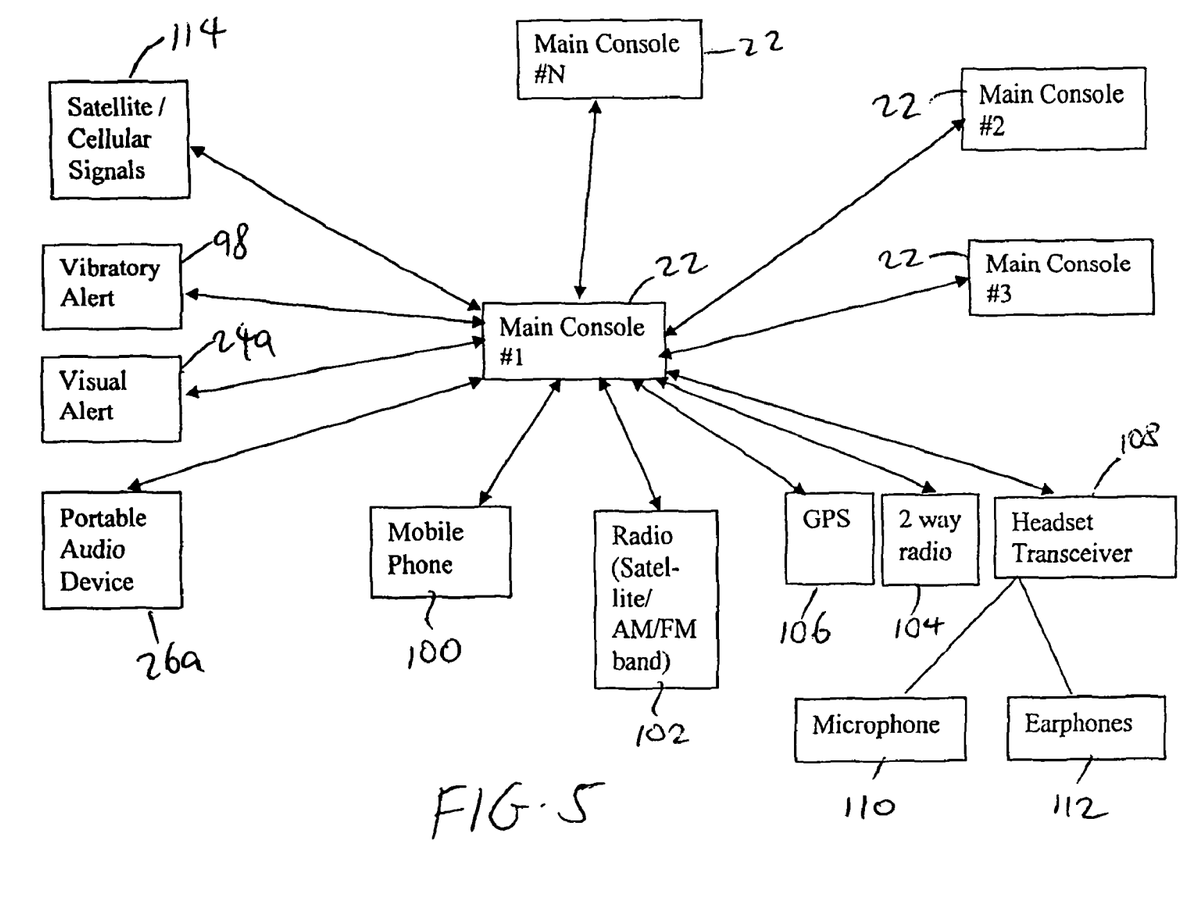
FIG. 5 is a schematic block diagram illustrating the communication system according to another embodiment of the present invention.

FIG. 5 illustrates how the system shown in FIG. 4 can be extended to a complete communication system that can be used by motorcyclists. The main unit 22 can be provided as a main console, and each main unit 22 will include a receiver 23 that is similar to the receiver 58 or 70. As shown in FIG. 5, one main unit 22 (designated as Main Console #1) can communicate with a plurality of other main units 22 via the transmitter 46 and the receivers 23 in a network of main consoles and other peripheral devices that can be configured in any desired manner depending on the number of users, and the desired objectives. The communication can be bi-directional or in a single direction. These electronic peripheral devices can be adapted to wirelessly communicate with the main unit 22, and can include a visual alert 24a, a portable audio device 26a, a vibratory alert 98, a mobile phone 100, a radio 102, a two-way radio 104, a global positioning system (GPS) 106, and a headset transceiver 108, among others.

The visual alert 24a shown in FIG. 5 can be the same as the visual indicator 24 shown in FIGS. 3 and 4, except that other features can be incorporated if the visual indicator 24 is used in the communication system of FIG. 5. For example, the LEDs 75 (or other additional light sources) can be made to flash or emit light to alert the rider of incoming phone calls or other messages.

The headset transceiver 108 can include a microphone 110 and earphones 112. The earphones 112 can be mounted to the helmet in a manner similar to the headset speaker 52 described above, or can be ear plugs that are insertable into a rider's ears. The microphone 110 can be provided in a unitary unit together with the earphones 112, and the unit can be worn by the rider such that the microphone 110 is positioned adjacent the rider's mouth.

The audio device 26a shown in FIG. 5 can be the same as the audio indicator 26 shown in FIGS. 2 and 4, except that other audio devices can be used as part of this communication system. Examples of these audio devices include MP3 players, CD players and the like. The main unit 22 receives audio signals from the audio device 26a, and then transmits these signals to the transceiver 108 which then transmits these signals to the earphones 112 to broadcast music or sounds. Audio signals from the radio 102 can be communicated using the same method. Similarly, GPS signals from the GPS 106 can be communicated in the form of audio signals to provide auditory directions to the rider. The rider can control the audio devices 26a, GPS 106 and radio 102 at the main unit 22, or directly at the particular peripheral device.

The mobile phone 100 can communicate with the rider via the main unit 22, which relays the phone signals to the earphone 112 and from the microphone 110 via the transceiver 108. This allows the rider to place and receive phone calls without having to hold the phone to his/her head. Speech recognition software can be employed to help the rider place and receive phone calls. Audio signals to and from the two-way radio 104 can be communicated using the same method to allow a rider to communicate with another rider. The rider can control the phone 100 or the two-way radio 104 at the main unit 22, or directly at the particular peripheral device.

In addition, the main unit 22 can communicate with one or more of a plurality of other main units 22 (i.e., other riders). Each rider can communicate using the microphone 110 and earphones 112 at the transceiver 108, which communicates with another rider via the main units 22 that are associated with rider. As shown in FIG. 5, a network of riders can be created to allow for the sharing of information relating to road conditions, traffic, weather, and other factors. For example, when a rider encounters a radar signal, the location of the radar signal can be stored for a period of time at a central database that can be accessed by other riders. When another rider enters the geographic area of the radar signal, the recent radar signals stored in the network are conveyed to the new rider. Thus, each main unit 22 is essentially used as a communication hub.

The main unit 22 can even communicate signals received from satellites, cellular and other sources 114. These signals can contain information relating to weather, traffic, road hazards, etc.

As an alternative, the radar detector and the laser detector can be provided as separate peripheral devices, and not as part of the main unit 22.

Figure 6A:
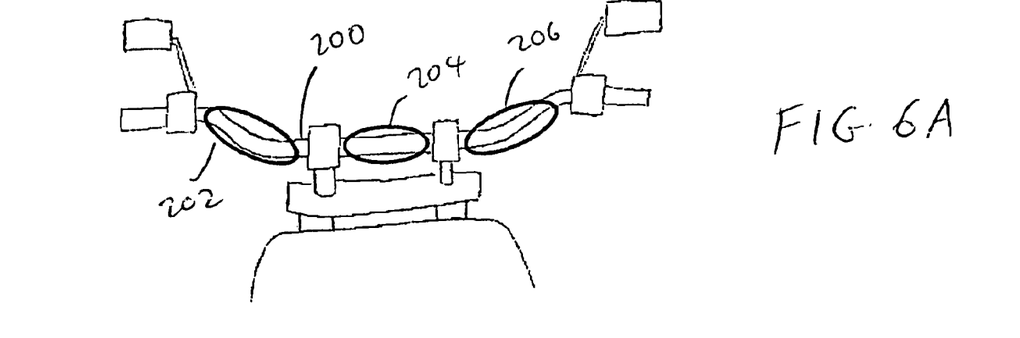
FIGS. 6A-6C illustrate various locations on a motorcycle where a mounting assembly can be mounted.
Figure 6B:
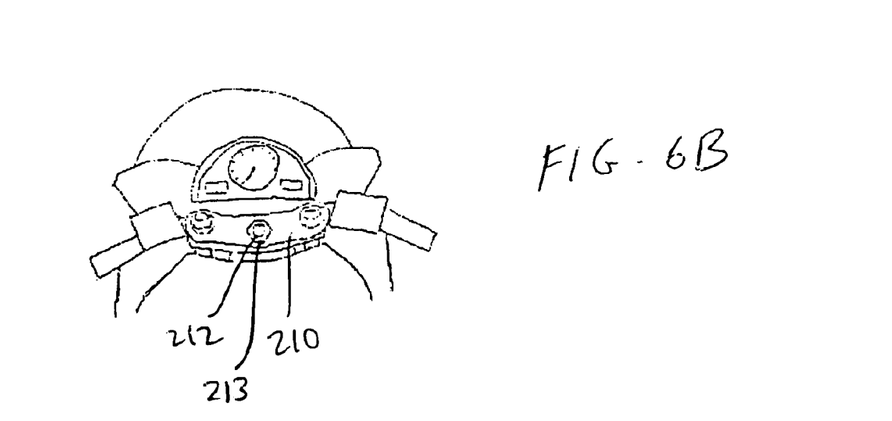
Figure 6C:
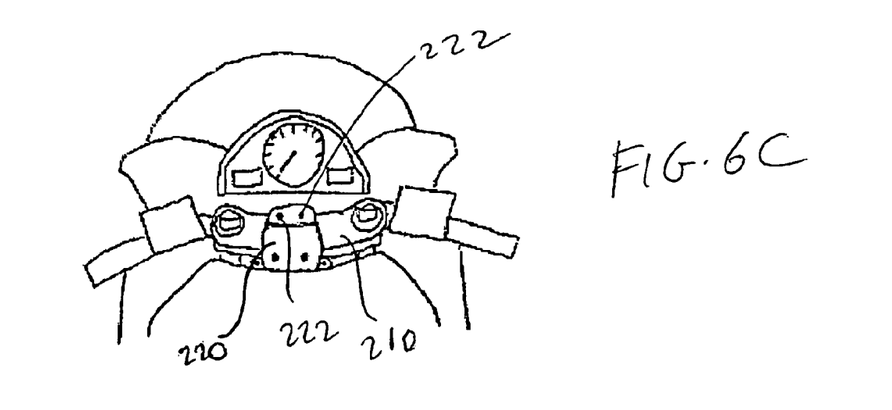

FIGS. 6A-6C illustrate the various mounting assemblies that can be used to mount the main unit 22 to a motorcycle. FIG. 6A illustrates the handlebar 200 of a conventional motorcycle. The mounting assembly can be secured to any of the locations indicated by the circled regions 202, 204 and 206 along the handlebar 200. FIG. 6B illustrates the steering bridge 210 of a conventional motorcycle. The bridge 210 has a steering stem 212 that is surrounded by a nut 213. The mounting assembly can be secured to the steering bridge 210 by replacing the stock steering stem nut 213. FIG. 6C illustrates the steering stabilizer 220 on a bridge 210 of a Honda™ CBR1000RR. The mounting assembly can be secured to the steering stabilizer 220 by removing the two top cover screws 222.

Figure 7A:
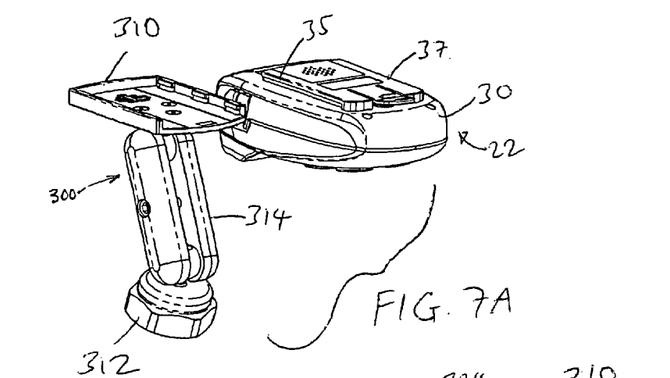
FIG. 7A is an exploded perspective view of a mounting assembly that can be utilized for a sport-bike mount, shown with the main unit.
Figure 7B:
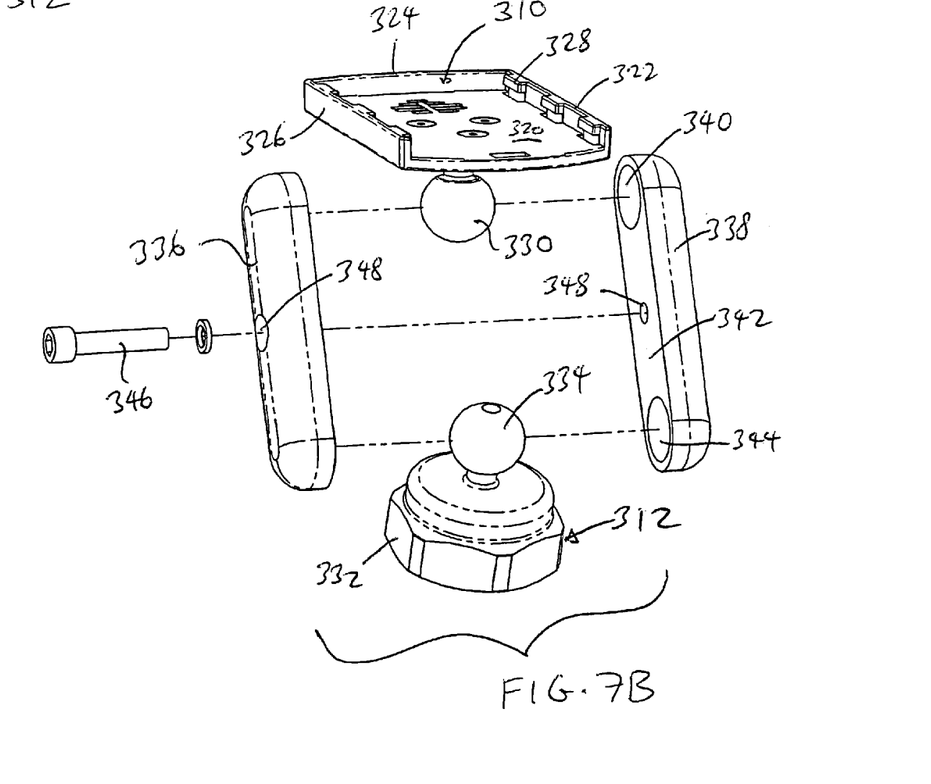
FIG. 7B is an exploded perspective view of the mounting assembly of FIG. 7A.

FIGS. 7A-7B illustrate a mounting assembly 300 that can be mounted to the location of the stem 212 in FIG. 6B by removing the nut 213 at the stem 212. The mounting assembly 300 has a support bracket 310, a nut mount 312, and a link 314 that pivotably couples the bracket 310 to the nut mount 312. The bracket 310 has a planar base 320, and three side walls 322, 324, 326. Short extensions 328 extend inwardly from the side walls 322, 326 to define two opposing rail tracks. A ball 330 extends from the bottom of the base 320. The nut mount 312 has a hexagonal body 332 that has internal threads (not shown) that are adapted to be threadably engaged to the steering stem 212 of the motorcycle in place of the nut 213. A ball 334 extends from the top of the body 332. The link 314 has two separate link pieces 336 and 338. Each link piece 336, 338 has a hemispherical recess 340 provided on the inner surface 342 at its top end, and another hemispherical recess 344 provided on the inner surface 342 at its bottom end. The ball 330 is adapted to be received for pivoting motion inside the recesses 340, and the ball 334 is adapted to be received for pivoting motion inside the recesses 344. A screw 346 extends through threaded openings 348 provided at about the center of the link pieces 336, 338 to secure the link pieces 336, 338 together.

Referring to FIG. 7A, the bottom of the housing 30 of the main unit 22 has a set of opposing L-shaped flanges 35 and 37 that are adapted to be slid under the extensions 328 of the side walls 322 and 326, respectively, to secure the main unit 22 to the bracket 310 of the mounting assembly 300. In use, the nut mount 312 is threadably secured to the steering stem 212 of the motorcycle after the nut 213 has been removed, and the pivoting ball joints at the balls 330, 334 allow the bracket 310 to be positioned at any desired orientation or angle with respect to the steering stem 210.

Figures 8A, 8B:
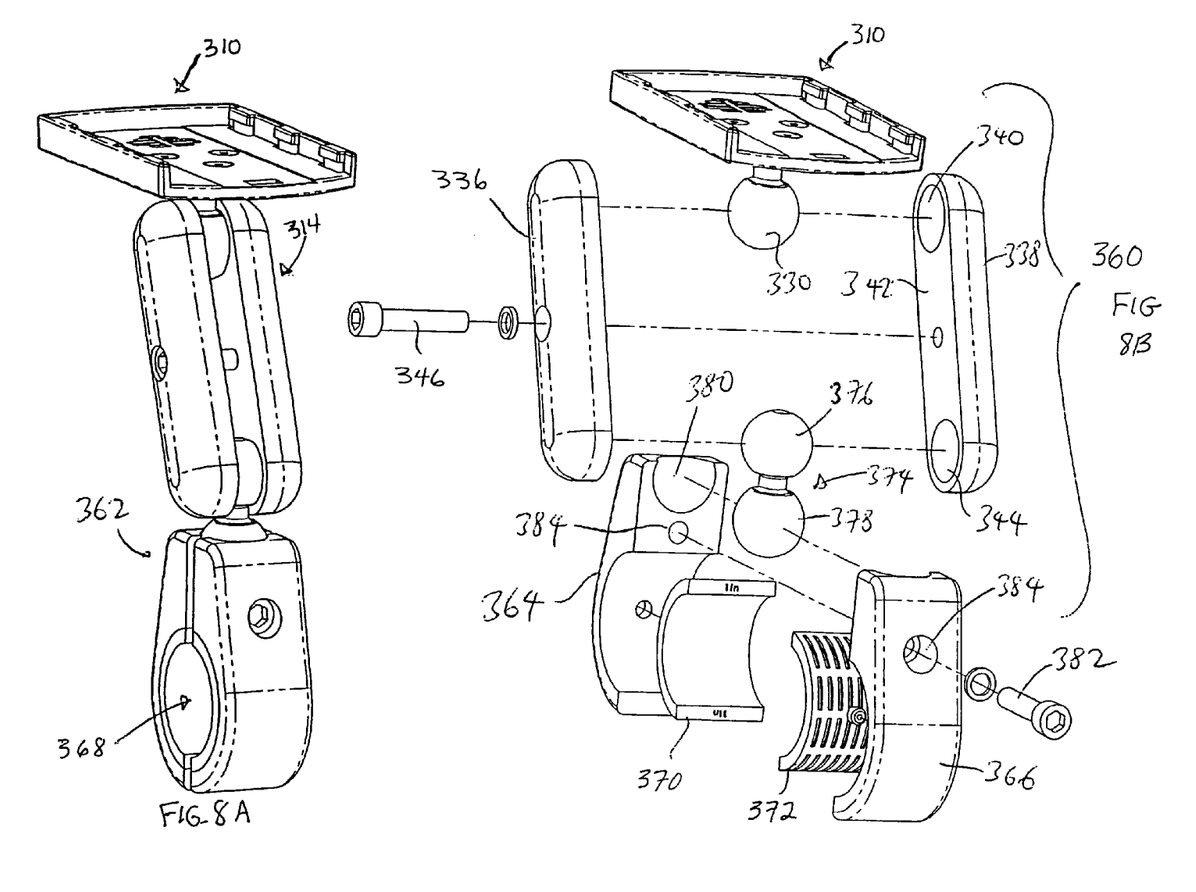
FIG. 8A is a perspective view of a mounting assembly that can be utilized for a handlebar mount.
FIG. 8B is an exploded perspective view of the mounting assembly of FIG. 8A.

FIGS. 8A-8B illustrate a mounting assembly 360 that can be mounted to any of the handlebar locations 202, 204, 206 shown in FIG. 6A. The mounting assembly 360 has a support bracket 310, handlebar mount 362, and a link 314 that pivotably couples the bracket 310 to the handlebar mount 362. The bracket 310 and the link 314 can be the same as the bracket 310 and link 314 described above in connection with FIGS. 7A-7B. The handlebar mount 362 has a left holder 364 and a right holder 366, each of which is semi-circular in configuration to define a generally cylindrical interior space 368 that is adapted to receive the shaft of a handlebar of a motorcycle. Semi-circular spacers 370, 372 can be provided on the interior concave surfaces of the holders 364, 366 to provide a better grip of the handlebar 200. In addition, a hemispherical recess 380 is provided on the inner surface at its top end of both holders 364, 366. A double-ball joint 374 having two balls 376, 378 is provided to pivotably couple the link 314 to the mount 362. Specifically, the ball 376 is received for pivoting motion inside the recesses 344 of the link pieces 336, 338, and the ball 378 is received for pivoting motion inside the recesses 380 of the holders 364, 366. In addition, the ball 330 is adapted to be received for pivoting motion inside the recesses 340 of the link pieces 336, 338. In use, the holders 364, 366 are placed around the shaft of a handlebar 200, and a screw 382 is threaded through threaded openings 384 in the holders 364, 366 to secure the holders 364, 366 together around the shaft. The pivoting ball joints at the balls 330, 376, 378 allow the bracket 310 to be positioned at any desired orientation or angle with respect to the handlebar 200.

Figure 9A:
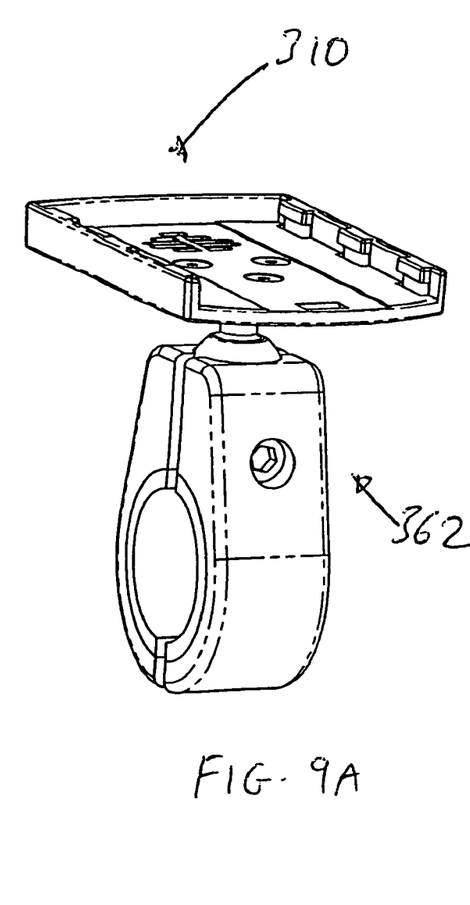
FIG. 9A is a perspective view of another mounting assembly that can be utilized for a handlebar mount.
Figure 9B:
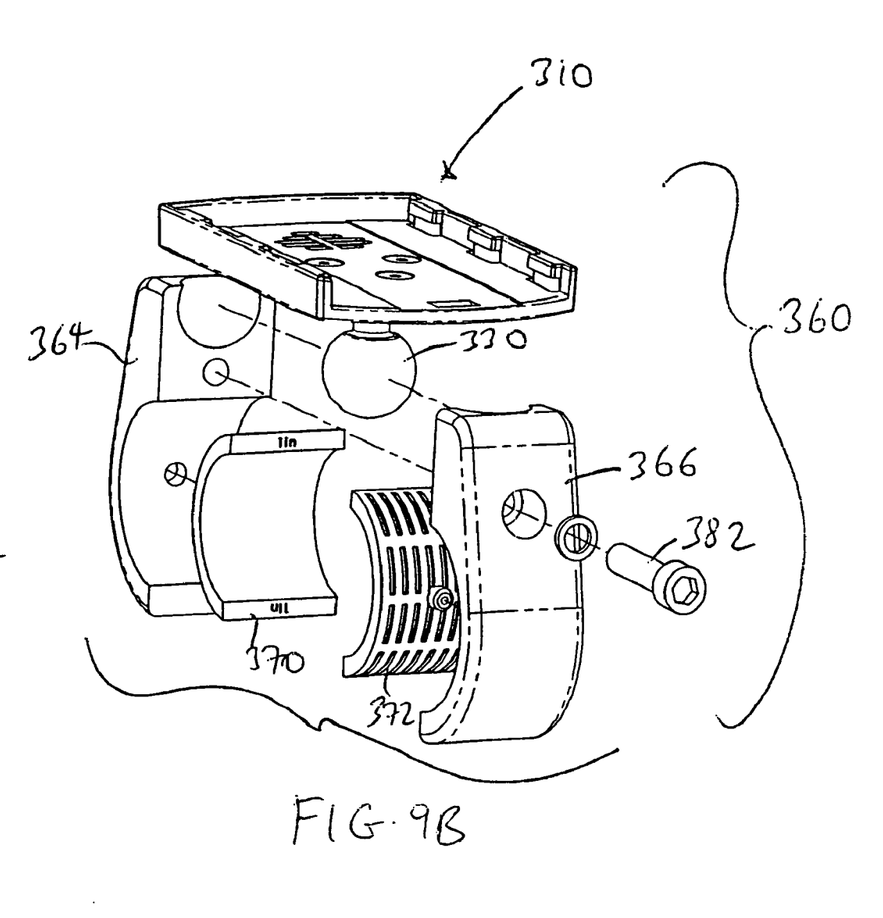
FIG. 9B is an exploded perspective view of the mounting assembly of FIG. 9A.

FIGS. 9A-9B illustrate a modification that can be made to the mounting assembly 360, where the two-ball joint 374 and the link 314 have been omitted, so that the ball 330 is adapted to be received for pivoting motion inside the recesses 380 of the holders 364, 366. The pivoting ball joint at the ball 330 allows the bracket 310 to be positioned at any desired orientation or angle with respect to the handlebar 200.

Figure 10A:
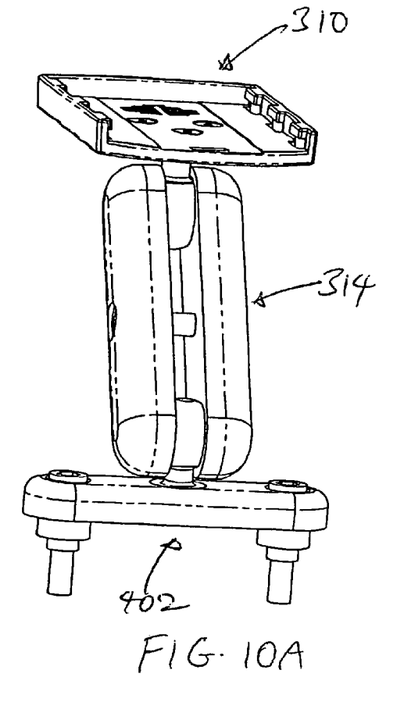
FIG. 10A is a perspective view of a mounting assembly that can be utilized for the Honda™ CBR1000RR motorcycle.
Figure 10B:
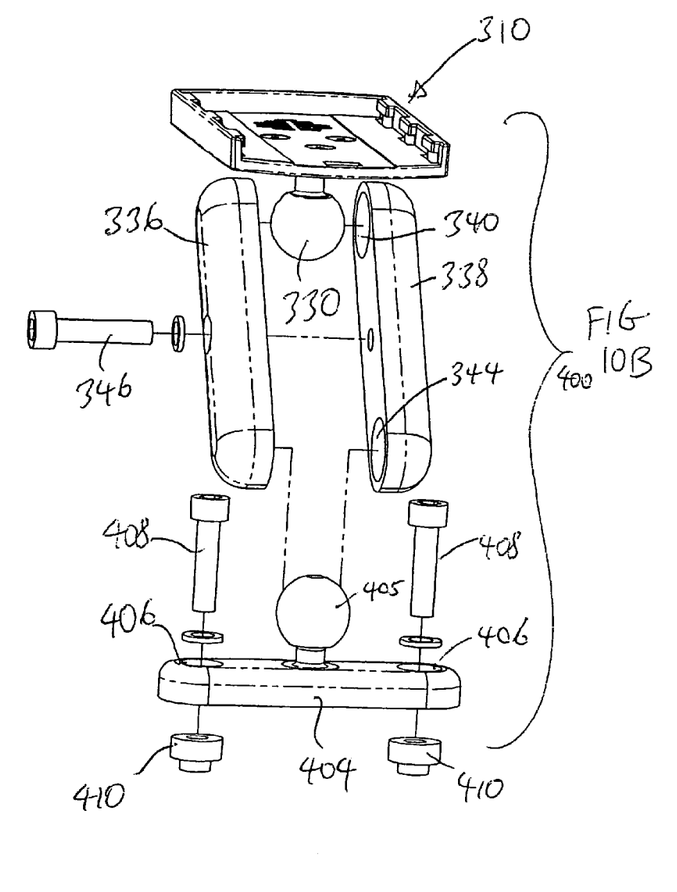
FIG. 10B is an exploded perspective view of the mounting assembly of FIG. 10A.

FIGS. 10A-10B illustrate a mounting assembly 400 that can be mounted to the steering stabilizer 220 in FIG. 6C of a Honda™ CBR1000RR motorcycle. The mounting assembly 400 includes a bracket 310 and a link 314 that can be the same as the bracket 310 and link 314 in FIGS. 7A-7B. The nut mount 312 is replaced by a bar mount 402, which has a bar 404, a ball 405 provided at the top of the bar 404, and two openings 406 provided at opposite ends of the bar 404. Bolts 408 are threaded through the openings 406 to be secured to openings provided on the steering stabilizer 220 on a Honda™ CBR1000RR motorcycle. Washers 410 can be provided below the bar 404 to further facilitate the mounting. The ball 405 is received for pivoting motion inside the recesses 344. In use, the bar mount 402 is secured to the steering stabilizer 220, and the pivoting ball joints at the balls 330, 405 allow the bracket 310 to be positioned at any desired orientation or angle with respect to the steering stabilizer 220.

Figure 11A:
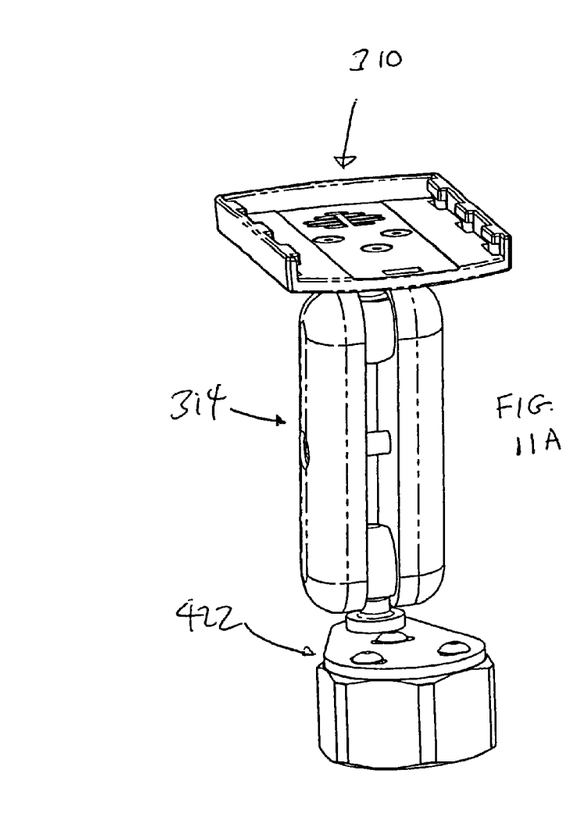
FIG. 11A is a perspective view of a mounting assembly that can be utilized for the Kawasaki™ ZX-10R motorcycle.
Figure 11B:
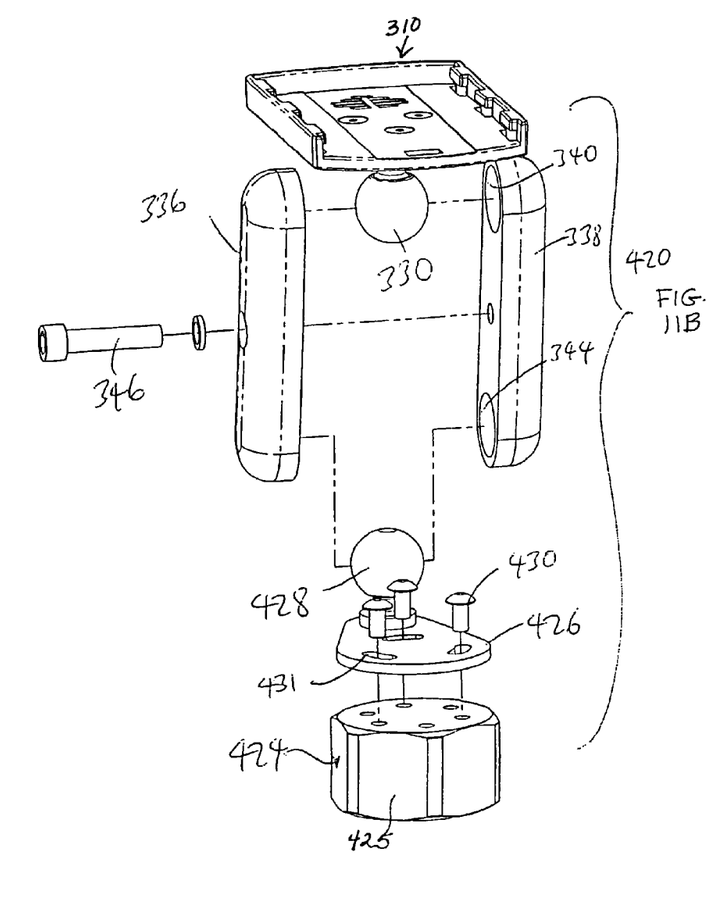
FIG. 11B is an exploded perspective view of the mounting assembly of FIG. 11A.

FIGS. 11A-11B illustrate a mounting assembly 420 that can be mounted to the location of the stem 212 in FIG. 6B of a Kawasaki™ ZX-10R motorcycle. The mounting assembly 420 includes a bracket 310 and a link 314 that can be the same as the bracket 310 and link 314 in FIGS. 7A-7B. The nut mount 312 is replaced by a different nut mount 422, which has a nut 424 with hexagonal surfaces 425, a plate 426, and a ball 428 provided at the top of the plate 426. The plate 426 has a surface area that is greater than the surface area of the top of the nut 424, so that a portion of the plate 426 extends out from the periphery of the nut 424. The plate 426 is secured to the top of the nut 424 by screws 430, and slots 431 in the plate 426 allow the orientation of the plate 426 to be adjusted with respect to the nut 424. The ball 428 is located at the portion of the plate 426 that extends out from the periphery of the nut 424, so as to avoid interference with the steering stabilizer on the Kawasaki™ ZX-10R motorcycle. The ball 428 is received for pivoting motion inside the recesses 344. In use, the nut mount 422 is threadably secured to the steering stem 212 of a Kawasaki™ ZX-10R motorcycle, and the pivoting ball joints at the balls 330, 428 allow the bracket 310 to be positioned at any desired orientation or angle with respect to the steering stem 212.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A communication system, comprising:
   a first main unit coupled to a first motorcycle;
   a first peripheral device coupled to the first main unit for communication therewith;
   a second main unit coupled to a second motorcycle;
   a second peripheral device coupled to the second main unit for communication therewith; and
   wherein the first and second main units communicate signals with each other.

2. The system of claim 1, wherein the first and second main units communicate signals relating to the detection of a police radar.

* * * * *